United States Patent [19]
Nakahashi

[11] 4,279,476
[45] Jul. 21, 1981

[54] OBJECTIVE LENS SYSTEM FOR MICROSCOPES

[75] Inventor: Ken-ichi Nakahashi, Hachiouji, Japan

[73] Assignee: Olympus Optical Co., Ltd., Tokyo, Japan

[21] Appl. No.: 101,187

[22] Filed: Dec. 7, 1979

[30] Foreign Application Priority Data

Dec. 11, 1978 [JP] Japan ................................. 53/153295

[51] Int. Cl.³ .......................... G02B 9/34; G02B 21/02
[52] U.S. Cl. ...................................... 350/414; 350/469
[58] Field of Search ........................ 350/175 ML, 220

[56] References Cited
U.S. PATENT DOCUMENTS

| 2,713,808 | 7/1955 | Klein | 350/220 |
|---|---|---|---|
| 3,437,398 | 4/1969 | Muller et al. | 350/175 ML |

Primary Examiner—John K. Corbin
Assistant Examiner—Scott J. Sugarman
Attorney, Agent, or Firm—Cushman, Darby & Cushman

[57] ABSTRACT

A plan achromat objective lens system designed for a magnification level on the order of 40× for use with microscopes comprising a first negative meniscus lens component, a second positive lens component, a third positive cemented doublet and a fourth positive cemented doublet, said objective lens system being so adapted as to correct various aberrations favorably with the small number of lens components.

10 Claims, 10 Drawing Figures

OBJECTIVE LENS SYSTEM FOR MICROSCOPES

BACKGROUND OF THE INVENTION (a) Field of the Invention

The present invention relates to a plan achromat objective lens system for microscopes which is designed for a magnification level of 40×.

(b) Description of the Prior Art

As the conventional plan achromat objective lens system designed for a magnification level of approximately 40× for use with microscopes, there is known a lens system comprising a thick meniscus lens component which is arranged on the extreme object side with a concave surface facing the object side. However, chromatic aberration spherical aberration, coma, etc. are usually aggravated by arranging this thick meniscus lens component on the exreme object side. In order to favorably correct these aberrations, the conventional objective lens system therefore used such a means as to arrange a cemented meniscus lens component to form a cemented surface in the front lens group or use increased number of lens components. Most of the conventional objective lens systems therefore comprised numerous lens components, for example, five components of eight lens elements.

SUMMARY OF THE INVENTION

A general object of the present invention is to provide an objective lens system for microscopes comprising a small number of lens components, i.e., four components of six lens elements and favorably corrected in its various aberrations.

The objective lens system for microscopes according to the present invention comprises a first negative meniscus lens component having a concave surface on the object side, a second positive lens component, a third positive cemented doublet component and a fourth positive cemented doublet component, and said lens system being designed so as to satisfy the conditions listed below:

$$0.5f \leq d_1 \leq 0.7f \tag{1}$$

$$1.5/f \leq 1.4 \left| \frac{n_1 - 1}{r_2} \right| \leq \left| \frac{n_1 - 1}{r_1} \right| \leq 3.0/f \tag{2}$$

$$1.9 \geq n_1 \geq 1.7 \tag{3}$$

$$55 \geq \nu_1 \geq 35 \tag{4}$$

$$1.8 \geq n_2 \geq 1.7 \tag{5}$$

$$96 \geq \nu_4 \geq 80 \tag{6}$$

$$5.0f \geq d_7 \geq 4.0F \tag{7}$$

$$190 \leq 1.6(\nu_5 + \nu_6) \leq \nu_1 + \nu_2 + \nu_3 + \nu_4 \tag{8}$$

wherein the reference symbols are defined as follows:
$r_1$ and $r_2$: radii of curvature on both the surfaces of the first lens component
$d_1$: thickness of the first lens component
$d_7$: airspace reserved between the third lens component and the fourth lens component
$n_1$ and $n_2$: refractive indices of the first lens component and the second lens component respectively
$\nu_1, \nu_2, \nu_3, \nu_4, \nu_5, \nu_6$: Abbe's numbers of the respective lens elements of the first through the fourth lens elements
f: focal length of the objective lens system as a whole.

Now, significance of the afore-mentioned conditions will be described consecutively below. The objective lens system according to the present invention comprises a thick meniscus lens component having a concave surface on the object side as the first lens component whose shape is defined by the conditions (1), (2), (3) and (4). Among these conditions, the conditions (1) and (2) have the following significance. If thickness $d_1$ and the quotient defined by the condition (2) are smaller than the lower limits of the conditions (1) and (2) respectively, the first lens component is not a thick meniscus lens, making it difficult to properly correct Petzval's sum. If $d_1$ exceeds the upper limit of the condition (1), in contrast, higher order astigmatism will be aggravated around the visual field. When the upper limit of the condition (2) is exceeded in addition, the first lens component will have a larger negative refractive power, making it necessary to increase the positive refractive power of the lens system consisting of the lens components arranged at the subsequent stages. As a result, it will be difficult to correct aberrations related to the aperture (mainly spherical aberration and coma). Since it is impossible to zero the negative refractive power of the first lens component even by designing it so as to satisfy the conditions (1) and (2), it is obliged to give rather positive refractive power to the lens system consisting of the second and later lens components. In case of an objective lens system comprising a small number of lens component such as is provided by the present invention, however, it is impossible to reduce the positive refractive power for the lens system composed of the second and later lens components beyond a certain limit, thereby restricting the aberration-correcting capability of these lens components. It is therefore necessary to design in such a way that aberrations will be reduced in each of the lens components. Accordingly, the first lens component must be so designed as to minimize the aperture-related aberrations as small as possible and made of a material having a refractive index which can satisfy the condition (3). However, for most of the optical glass materials which are currently known as having refractive indices high enough to satisfy the condition (3), Abbe's numbers are so large as to produce longitudinal chromatic aberration and lateral chromatic aberrations which can hardly be corrected by the lens system composed of the lens components arranged at the subsequent stages. For this reason, it is required to make the first lens component of a material having a dispersion low enough to satisfy the condition (4). That is to say, a material which can satisfy the conditions (3) and (4) is selected for the first lens component to reduce the aperture-related aberrations (such as spherical aberration) as well as chromatic aberrations, thereby lessening the burden to correct the aberrations on the lens components arranged at the subsequent stages. If $n_1$ or $\nu_1$ deviates from the range defined by the condition (3) or (4), the aperture-related aberrations and chromatic aberrations are aggravated in the first lens component, and cannot be corrected sufficiently by the other lens components.

In the objective lens system according to the present invention, the second lens component is arranged immediately after the first lens component for the purpose of correcting astigmatism which is undercorrected by the first lens component. In order to correct the astigmatism produced by the first lens component, the second lens component must have a high refractive power, which in turn tends to produce spherical aberration in the second lens component. For preventing such spherical aberration, it is required to select for the second lens component a material which has a refractive index high enough to satisfy the condition (5). If the condition (5) cannot be satisfied, spherical aberration will be aggravated, resulting in adverse effect on the objective lens system.

Subsequent to the second lens component described above, a cemented doublet consisting of a negative lens element and a positive lens element is arranged as the third lens component, whose positive element arranged on the image side is made of a material having an Abbe's number large enough to satisfy the condition (6) so that the cemented doublet has a capability sufficient to correct longitudinal chromatic aberration. Longitudinal chromatic aberration will therefore be aggravated if $\nu_4$ is smaller than the lower limit of the condition (6).

All the parameters of $n_1$, $r_1$, $n_2$ and $\nu_4$ defined by the afore-mentioned conditions (3), (4), (5) and (6) should preferably have large values. Therefore, it is theoretically possible to select values larger than the upper limits of the conditions for the parameters to design favorable lens systems. However, the upper limits of these conditions were defined in view of the glass materials which are currently available.

Between the front lens group composed of the first, second and third lens components described above and the rear lens group consisting only of the fourth lens component, an airspace $d_7$ is reserved within the range defined by the condition (7) so as to correct the sine condition (OSC'), i.e., coma as well as spherical aberration. If $d_7$ deviates from the range defined by the condition (7), coma and spherical aberration will be aggravated. At the same time, materials of all the lens elements are so selected as to satisfy the condition (8) so that the lens system according to the present invention is capable of correcting lateral chromatic aberration. Speaking more concretely, the front lens group has a function to correct mainly longitudinal chromatic aberration, whereas the rear lens group has a capability to correct mainly lateral chromatic aberration. Though the effect to correct the lateral chromatic aberration becomes higher as the airspace $d_7$ is longer between the front and rear lens groups, it cannot be too long since the lens system cannot have too long a total length due to the nature inherent in the objective lens systems for microscopes. Further, if the airspace $d_7$ is too long, flux of the rays passing through the rear lens group will have a large diameter, thereby making it necessary to design a lens system having a large outside diameter. Taking these restrictions into consideration, upper limit of the airspace $d_7$ generally lies around eight times of the focal length of the whole lens system. However, the condition (7) of the present invention defines the upper limit of the airspace $d_7$ as $5.0f \geq d_7$ for the purpose of avoiding the possibility that the lens system has a total length too long to be accommodated into a lens barrel when the airspace $d_7$ exceeds the upper limit.

Arranged after the airspace $d_7$ reserved as described above is a cemented doublet (the fourth lens component) whose material is so selected as to satisfy the condition (8) for correcting chromatic aberration. In other words, the condition (8) serves in combination with the condition (7) for correcting lateral chromatic aberration produced by the front lens group, thereby assuring adequate balance in corrections of longitudinal and lateral chromatic aberrations throughout the entire lens system. If the upper limit of the condition (8) is exceeded, the lateral chromatic aberration will be undercorrected to such a degree that it cannot be corrected favorably with a compensating ocular adopted in microscopes (an ocular which is so designed as to correct lateral chromatic aberration produced by an objective lens system, thereby assuring favorably corrected lateral chromatic aberration with a combination of the objective lens system and ocular). If $1.6(\nu_6+\nu_6)$ is smaller than the lower limit of the condition (8), in contrast, it will be difficult to correct longitudinal and lateral chromatic aberrations produced by the first lens component with the entire lens system.

DESCRIPTION OF THE PREFERRED EMBODIMENTS

Figure 1:
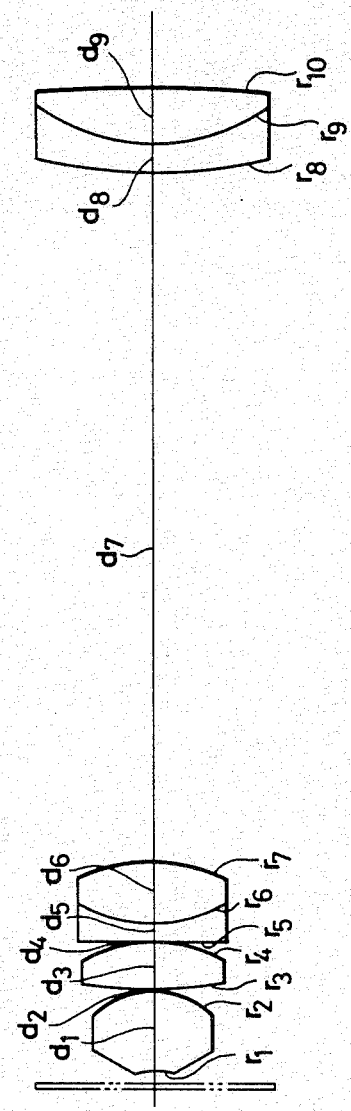
FIG. 1 shows a sectional view illustrating the composition of the objective lens system for microscopes according to the present invention.
Figure 2:
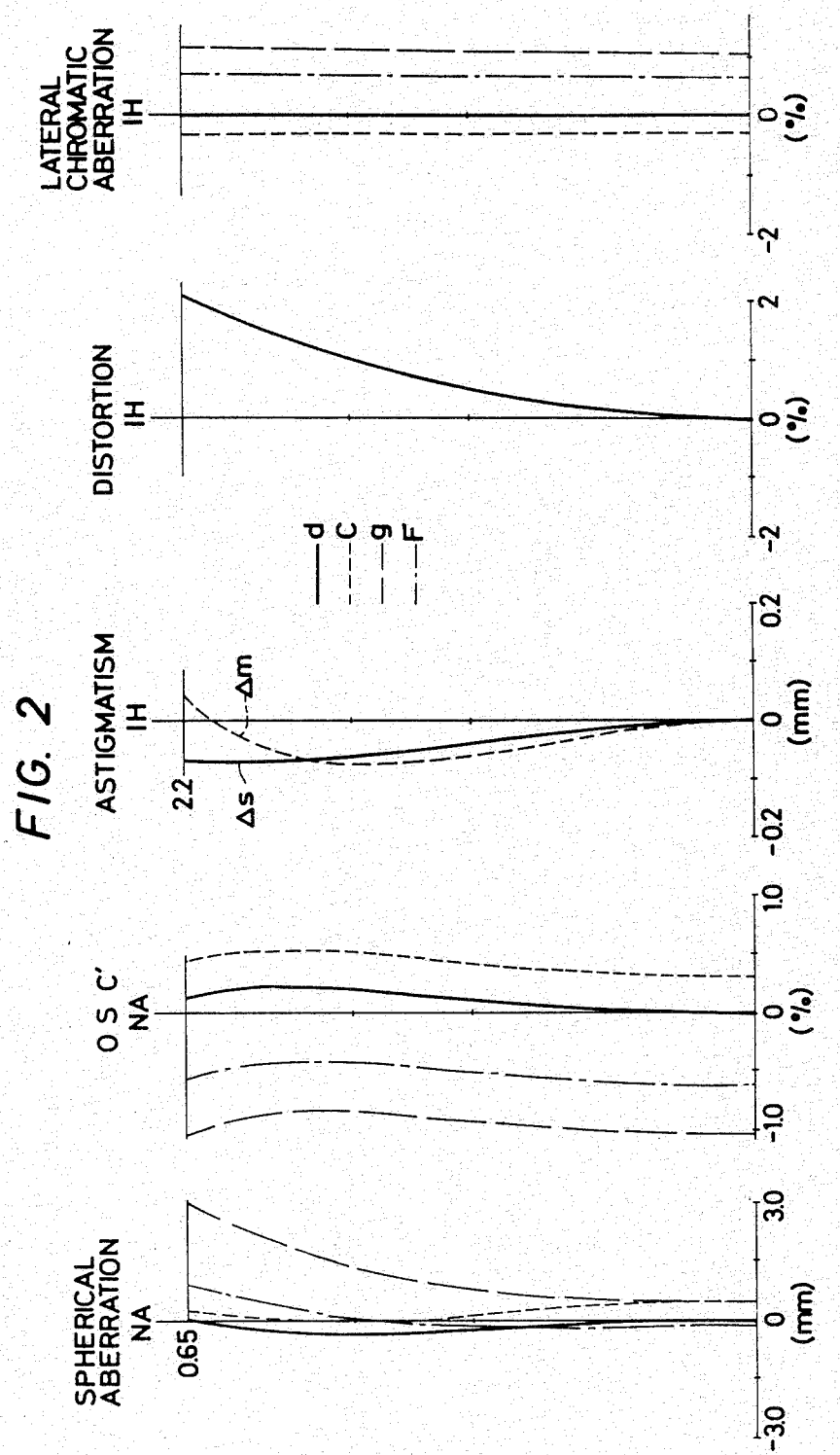
FIG. 2 shows curves illustrating the aberration characteristics of the Embodiment 1 of the present invention.
Figure 3:
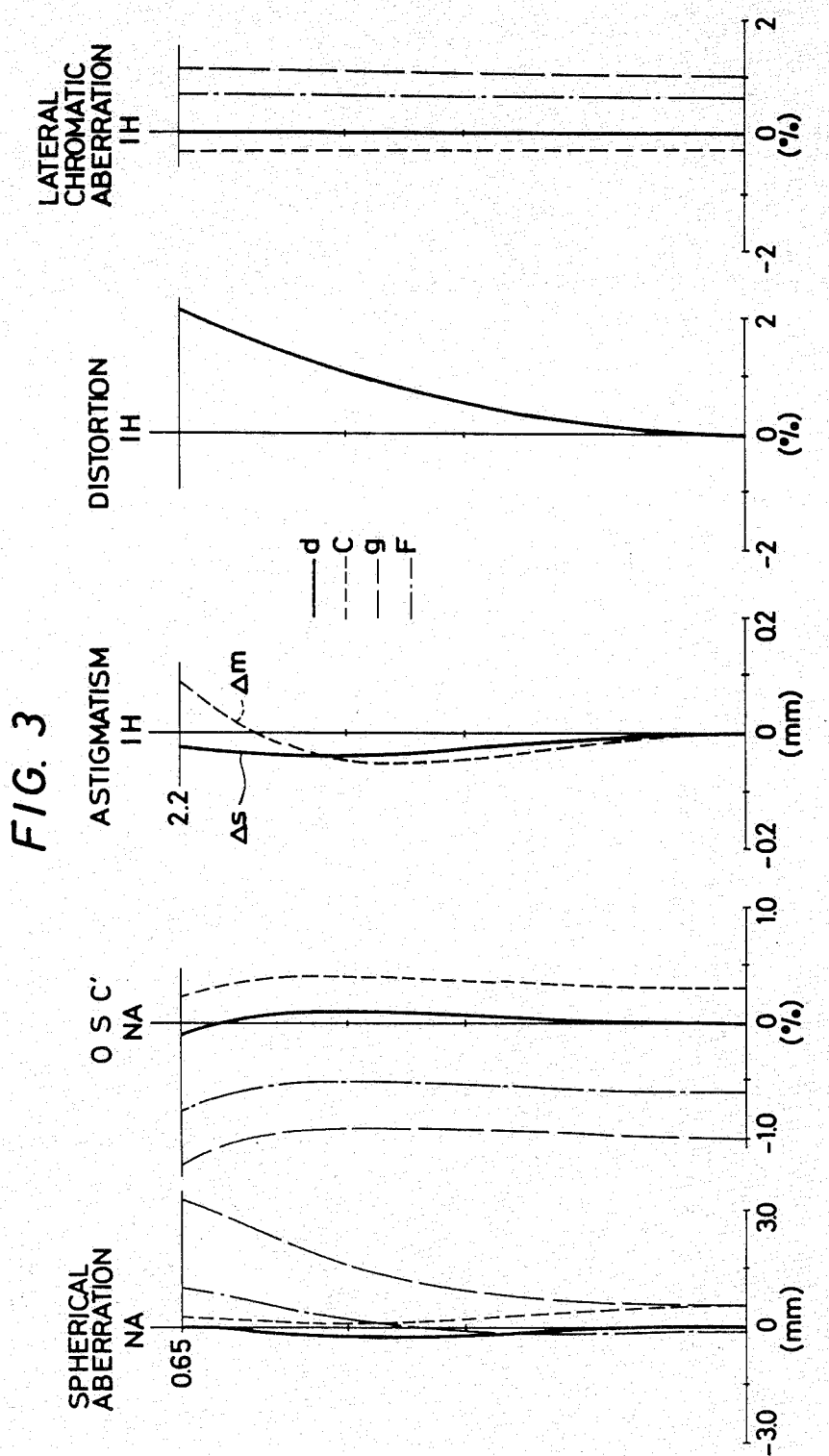
FIG. 3 shows curves illustrating the aberration characteristics of the Embodiment 2 of the present invention.
Figure 4:
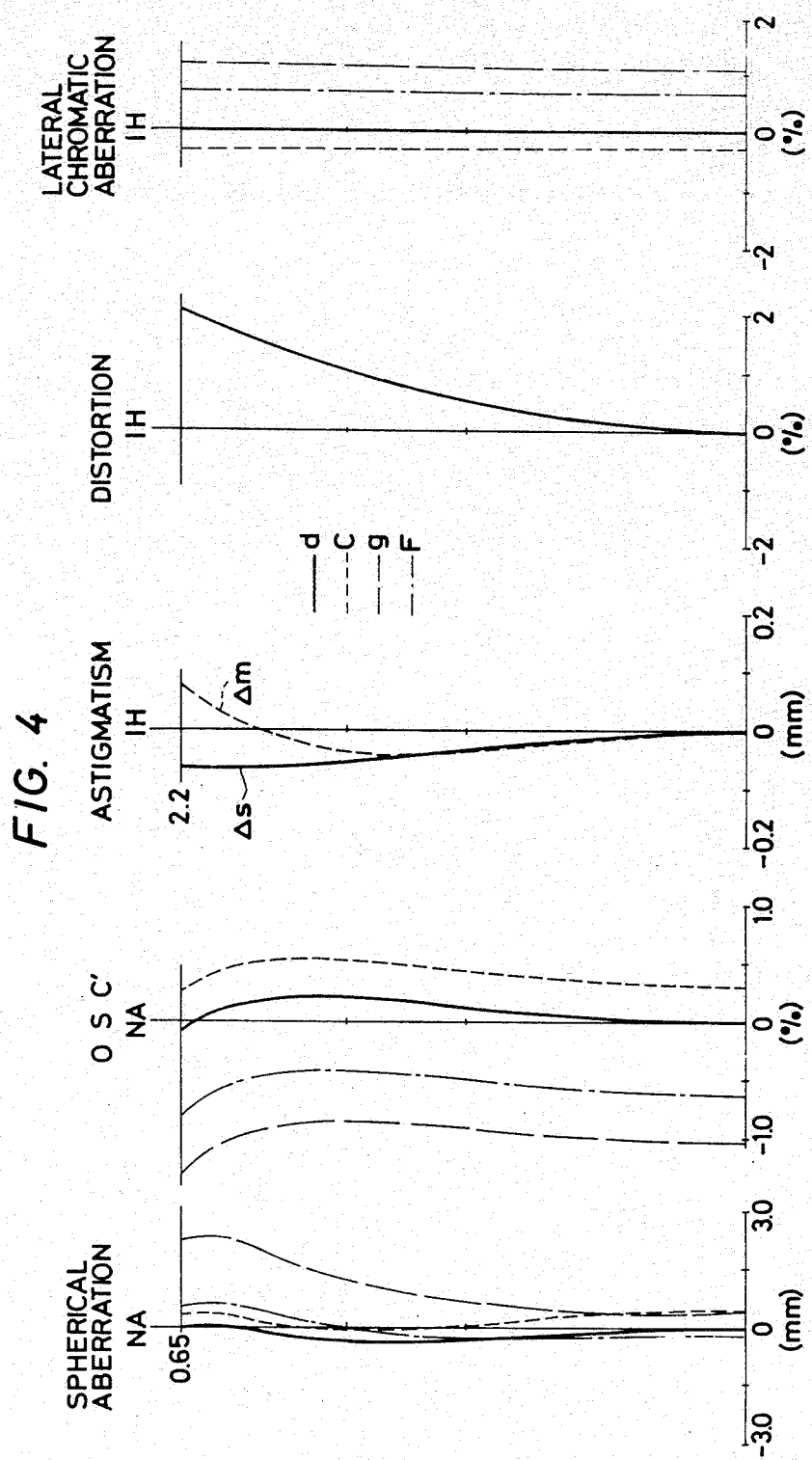
FIG. 4 shows curves illustrating the aberration characteristics of the Embodiment 3 of the present invention.
Figure 5:
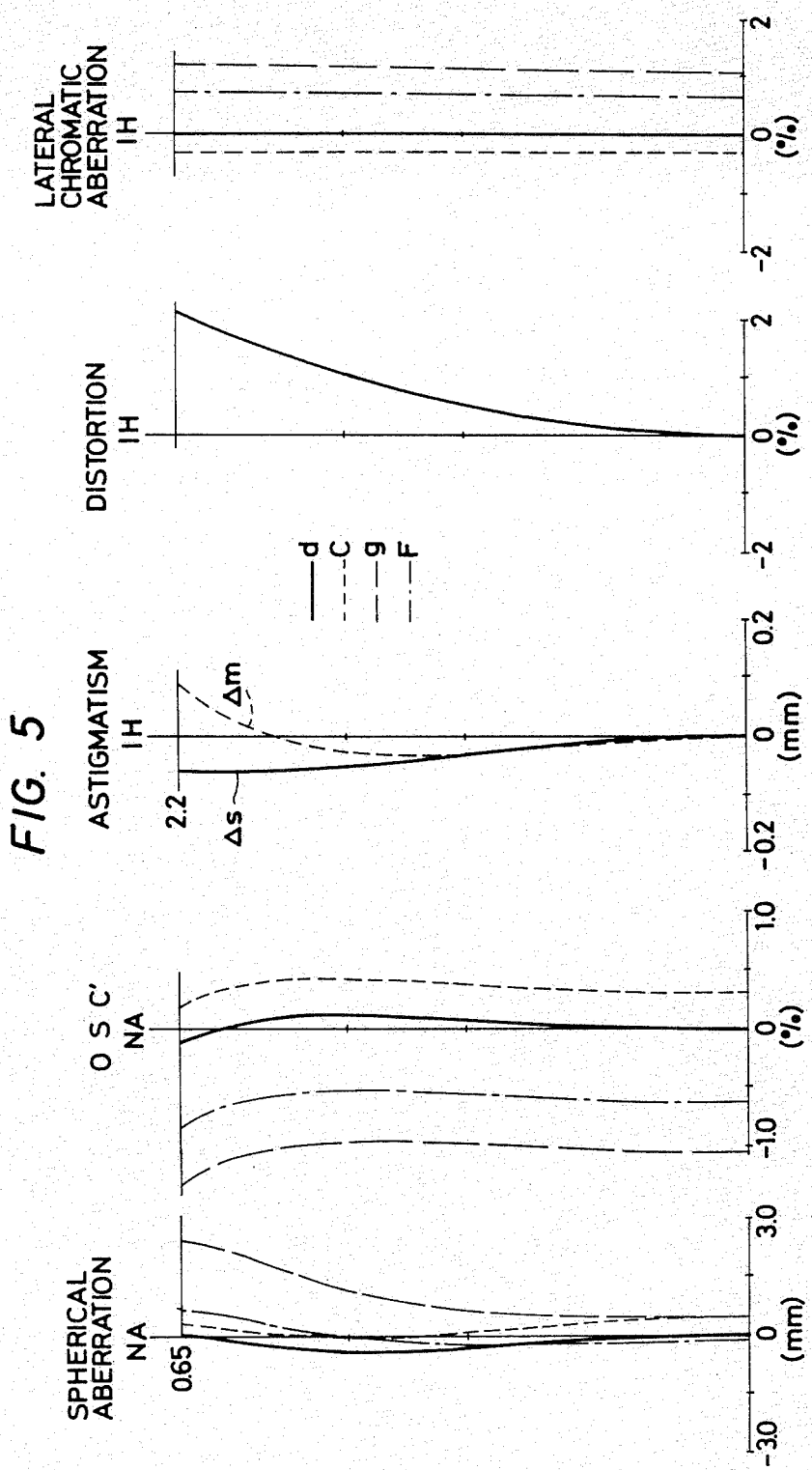
FIG. 5 shows curves illustrating the aberration characteristics of the Embodiment 4 of the present invention.
Figure 6:
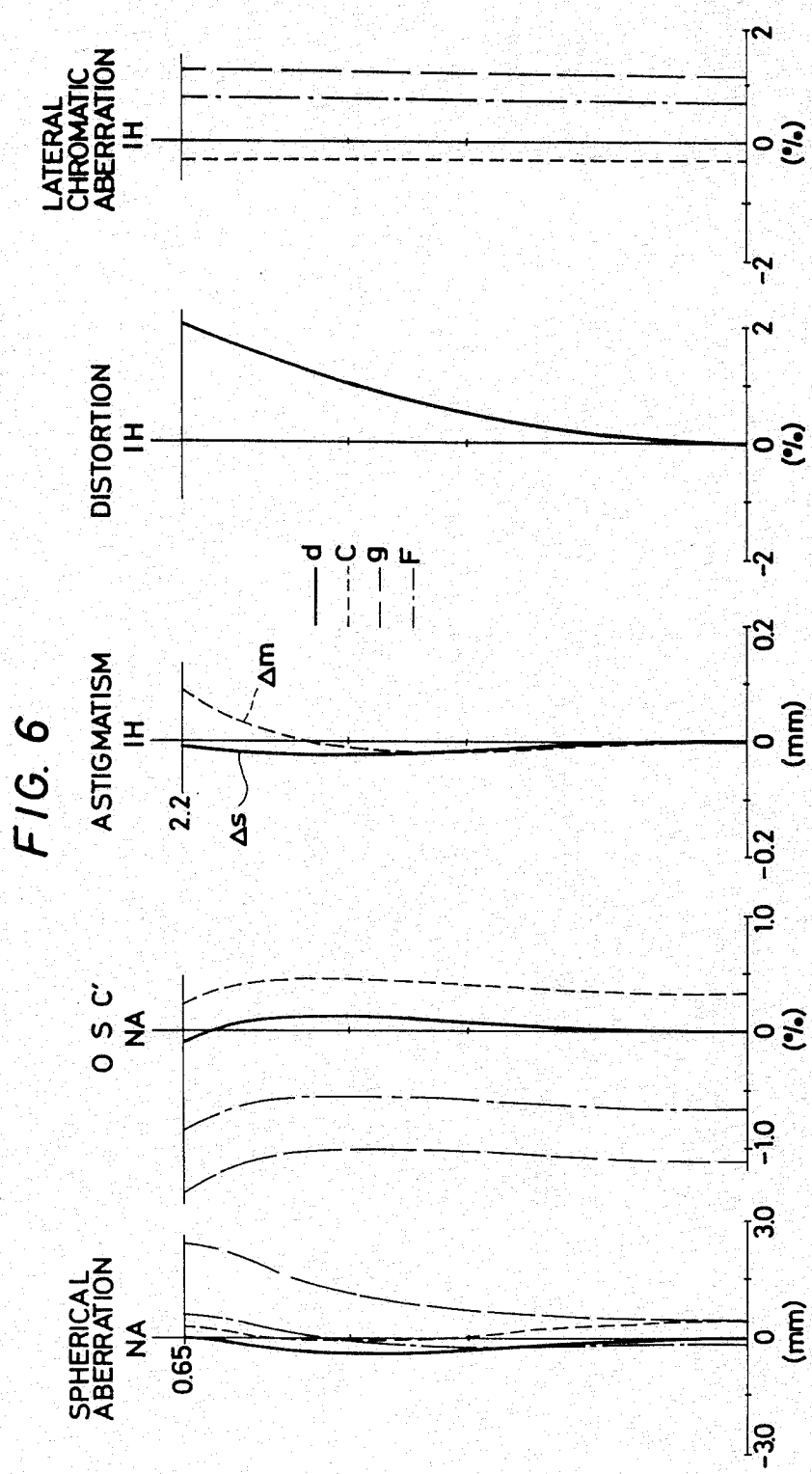
FIG. 6 shows curves illustrating the aberration characteristics of the Embodiment 5 of the present invention.
Figure 7:
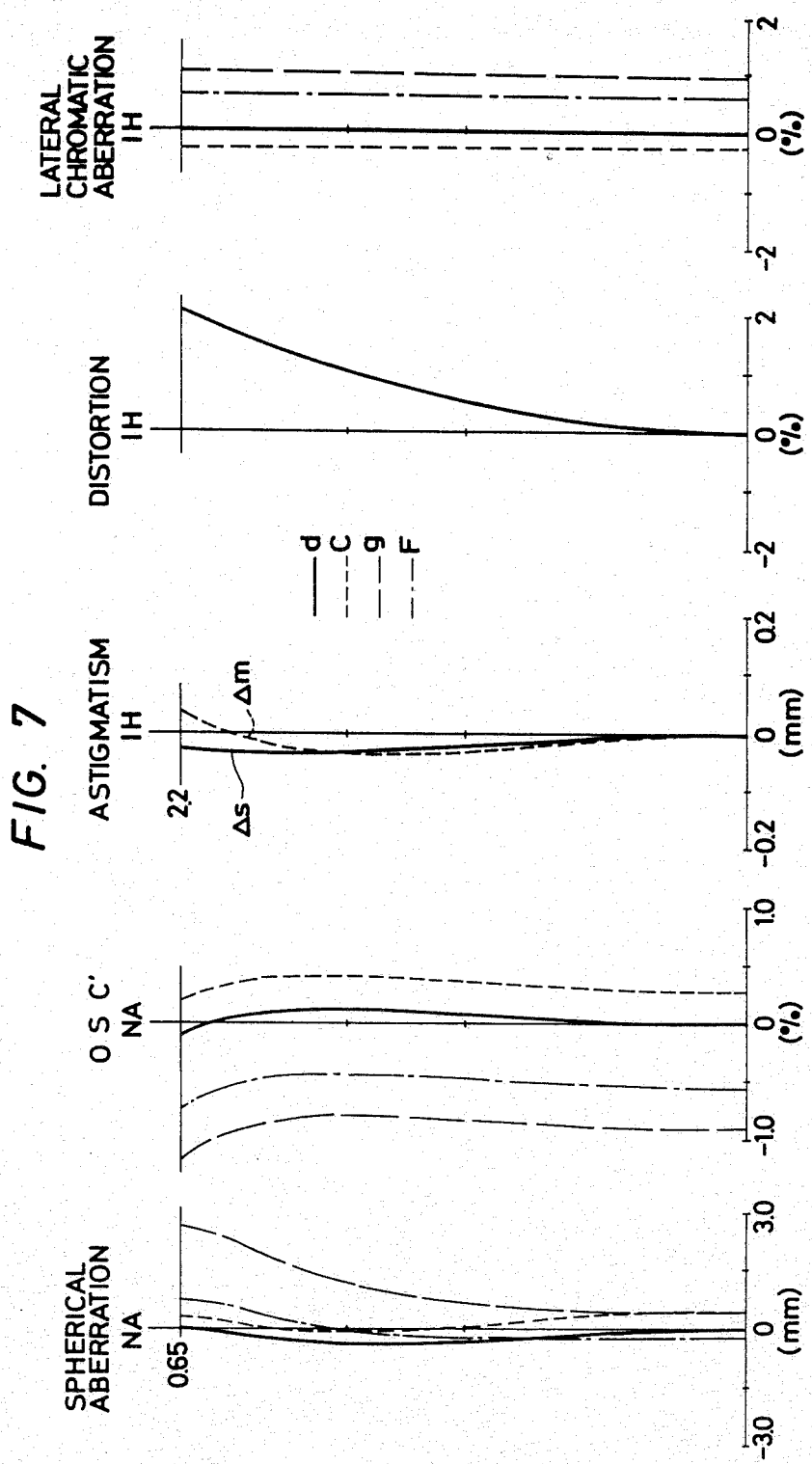
FIG. 7 shows curves illustrating the aberration characteristics of the Embodiment 6 of the present invention.
Figure 8:
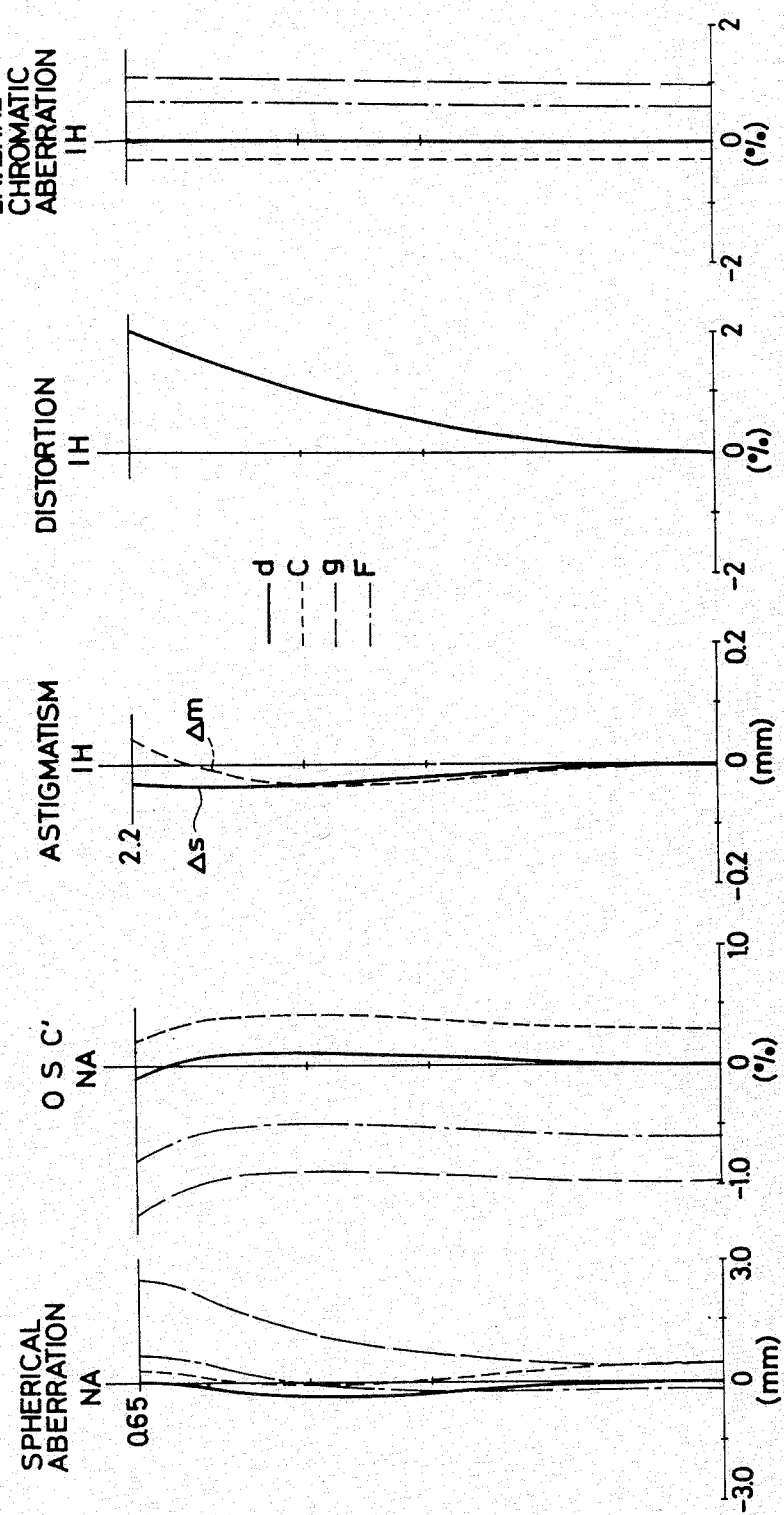
FIG. 8 shows curves illustrating the aberration characteristics of the Embodiment 7 of the present invention.
Figure 9:
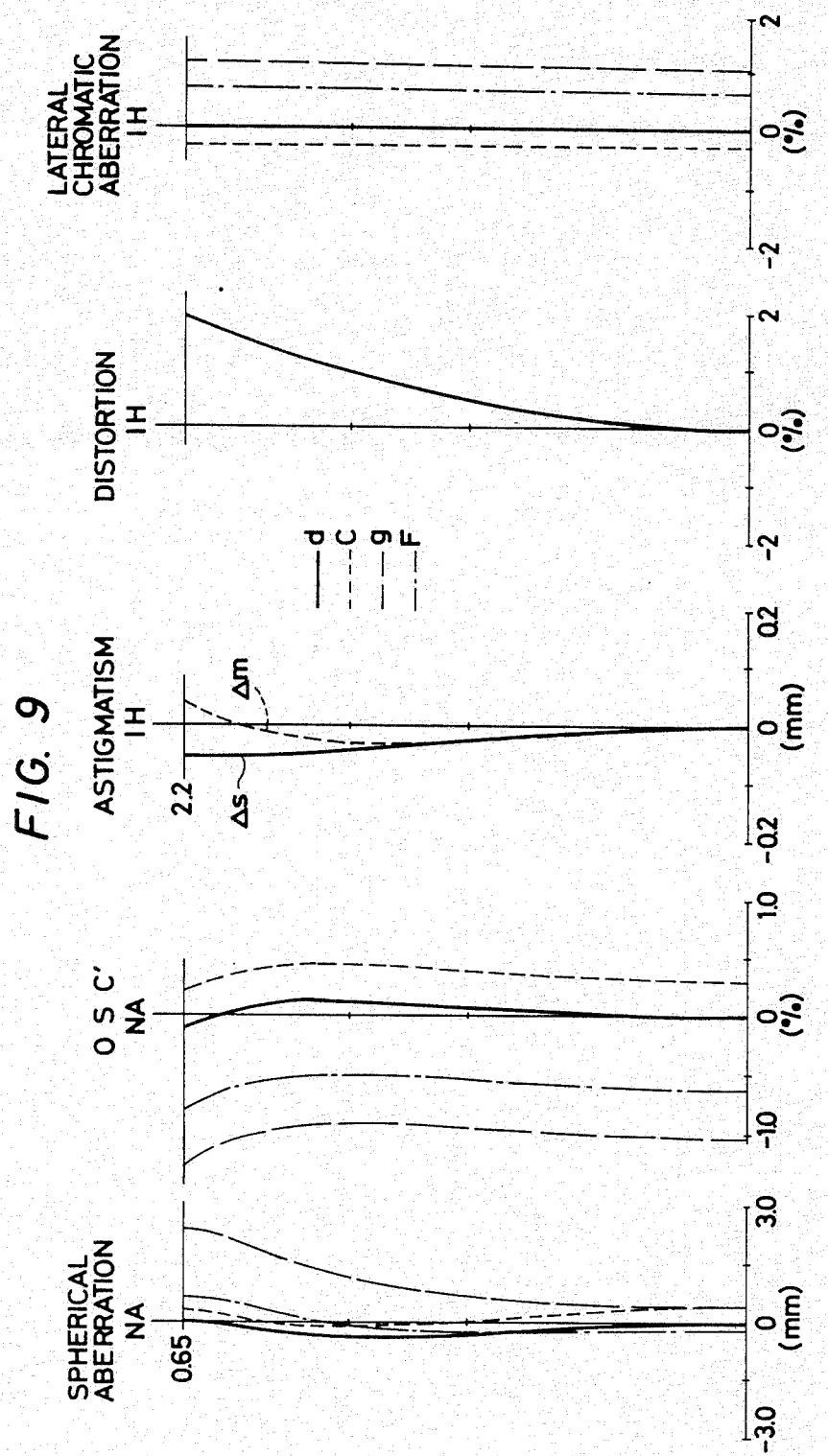
FIG. 9 shows curves illustrating the aberration characteristics of the Embodiment 8 of the present invention.
Figure 10:
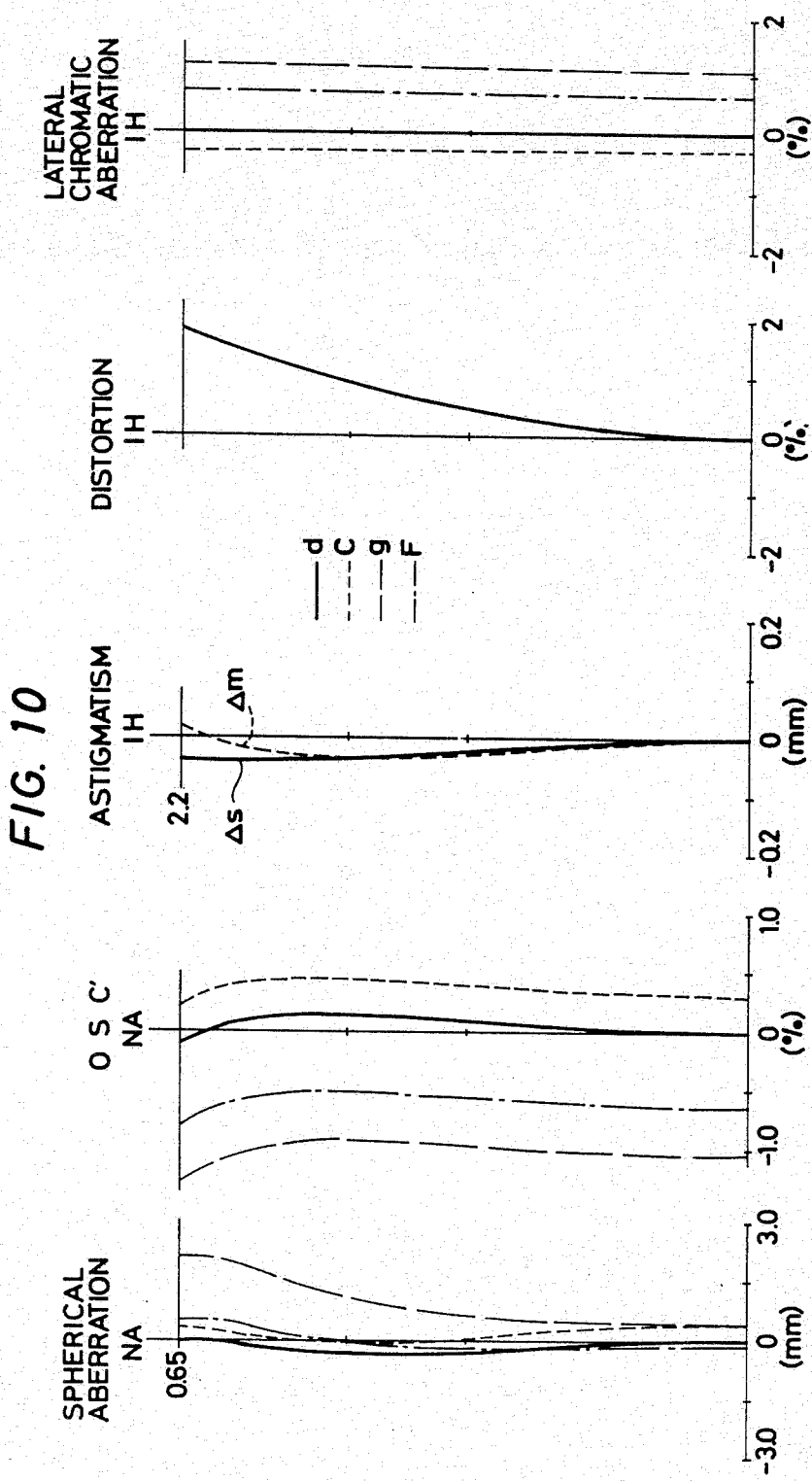
FIG. 10 shows curves illustrating the aberration characteristics of the Embodiment 9 of the present invention.

Now, some preferred embodiments of the present invention will be described in details with reference to the accompanying drawings

| Embodiment 1 | | | |
| --- | --- | --- | --- |
| $r_1 = -0.317$ | | | |
| | $d_1 = 0.567$ | $n_1 = 1.762$ | $\nu_1 = 40.2$ |
| $r_2 = -0.577$ | | | |
| | $d_2 = 0.011$ | | |
| $r_3 = 7.868$ | | | |
| | $d_3 = 0.292$ | $n_2 = 1.713$ | $\nu_2 = 53.89$ |
| $r_4 = -1.045$ | | | |
| | $d_4 = 0.011$ | | |
| $r_5 = 59.973$ | | | |
| | $d_5 = 0.112$ | $n_3 = 1.7552$ | $\nu_3 = 27.51$ |
| $r_6 = 0.977$ | | | |
| | $d_6 = 0.423$ | $n_4 = 1.43389$ | $\nu_4 = 95.15$ |
| $r_7 = -1.148$ | | | |

-continued

Embodiment 1

| | | | |
|---|---|---|---|
| $r_8 = 4.537$ | $d_7 = 4.704$ | | |
| | $d_8 = 0.166$ | $n_5 = 1.641$ | $\nu_5 = 56.93$ |
| $r_9 = 1.473$ | | | |
| | $d_9 = 0.434$ | $n_6 = 1.48749$ | $\nu_6 = 70.15$ |
| $r_{10} = -17.947$ | | | |
| | $f = 1.00$ | N.A = 0.65 | |
| Petzval's sum = 0.039 | | Magnification $-39.992X$ | |

Embodiment 2

| | | | |
|---|---|---|---|
| $r_1 = -0.305$ | | | |
| | $d_1 = 0.563$ | $n_1 = 1.72$ | $\nu_1 = 43.7$ |
| $r_2 = -0.5549$ | | | |
| | $d_2 = 0.011$ | | |
| $r_3 = 7.6596$ | | | |
| | $d_3 = 0.297$ | $n_2 = 1.713$ | $\nu_2 = 53.89$ |
| $r_4 = -1.063$ | | | |
| | $d_4 = 0.011$ | | |
| $r_5 = 50.978$ | | | |
| | $d_5 = 0.114$ | $n_3 = 1.7552$ | $\nu_3 = 27.51$ |
| $r_6 = 0.998$ | | | |
| | $d_6 = 0.429$ | $n_4 = 1.43389$ | $\nu_4 = 95.15$ |
| $r_7 = -1.17$ | | | |
| | $d_7 = 4.78$ | | |
| $r_8 = 4.7097$ | | | |
| | $d_8 = 0.169$ | $n_5 = 1.641$ | $\nu_5 = 56.93$ |
| $r_9 = 1.475$ | | | |
| | $d_9 = 0.441$ | $n_6 = 1.48749$ | $\nu_6 = 70.15$ |
| $r_{10} = -16.379$ | | | |
| | $f = 1.00$ | N.A = 0.65 | |
| Petzval's sum = 0.026 | | Magnification $-40.794X$ | |

Embodiment 3

| | | | |
|---|---|---|---|
| $r_1 = -0.307$ | | | |
| | $d_1 = 0.562$ | $n_1 = 1.72$ | $\nu_1 = 50.25$ |
| $r_2 = -0.562$ | | | |
| | $d_2 = 0.012$ | | |
| $r_3 = 3.939$ | | | |
| | $d_3 = 0.298$ | $n_2 = 1.713$ | $\nu_2 = 53.89$ |
| $r_4 = -1.030$ | | | |
| | $d_4 = 0.010$ | | |
| $r_5 = -13.468$ | | | |
| | $d_5 = 0.114$ | $n_3 = 1.74$ | $\nu_3 = 31.70$ |
| $r_6 = 0.808$ | | | |
| | $d_6 = 0.448$ | $n_4 = 1.48605$ | $\nu_4 = 81.81$ |
| $r_7 = -1.330$ | | | |
| | $d_7 = 4.600$ | | |
| $r_8 = 4.3405$ | | | |
| | $d_8 = 0.169$ | $n_5 = 1.6779$ | $\nu_5 = 53.36$ |
| $r_9 = 1.575$ | | | |
| | $d_9 = 0.441$ | $n_6 = 1.48749$ | $\nu_6 = 70.15$ |
| $r_{10} = -14.785$ | | | |
| | $f = 1.00$ | N.A = 0.65 | |
| Petzval's sum = 0.050 | | Magnification $-39.998X$ | |

Embodiment 4

| | | | |
|---|---|---|---|
| $r_1 = -0.307$ | | | |
| | $d_1 = 0.563$ | $n_1 = 1.720$ | $\nu_1 = 50.25$ |
| $r_2 = -0.551$ | | | |
| | $d_2 = 0.011$ | | |
| $r_3 = 4.237$ | | | |
| | $d_3 = 0.298$ | $n_2 = 1.726$ | $\nu_2 = 53.56$ |
| $r_4 = -1.040$ | | | |
| | $d_4 = 0.010$ | | |
| $r_5 = -7.4631$ | | | |
| | $d_5 = 0.114$ | $n_3 = 1.74$ | $\nu_3 = 31.7$ |
| $r_6 = 0.836$ | | | |
| | $d_6 = 0.448$ | $n_4 = 1.48605$ | $\nu_4 = 81.81$ |
| $r_7 = -1.269$ | | | |
| | $d_7 = 4.500$ | | |

-continued

Embodiment 4

| | | | |
|---|---|---|---|
| $r_8 = 4.858$ | | | |
| | $d_8 = 0.169$ | $n_5 = 1.6779$ | $\nu_5 = 53.36$ |
| $r_9 = 1.615$ | | | |
| | $d_9 = 0.441$ | $n_6 = 1.48749$ | $\nu_6 = 70.15$ |
| $r_{10} = -10.144$ | | | |
| | $f = 1.00$ | N.A = 0.65 | |
| Petzval's sum = 0.052 | | Magnification $-40.001X$ | |

Embodiment 5

| | | | |
|---|---|---|---|
| $r_1 = -0.3253$ | | | |
| | $d_1 = 0.583$ | $n_1 = 1.7725$ | $\nu_1 = 49.6$ |
| $r_2 = -0.5906$ | | | |
| | $d_2 = 0.011$ | | |
| $r_3 = 5.7075$ | | | |
| | $d_3 = 0.298$ | $n_2 = 1.726$ | $\nu_2 = 53.56$ |
| $r_4 = -1.0426$ | | | |
| | $d_4 = 0.013$ | | |
| $r_5 = -7.5229$ | | | |
| | $d_5 = 0.115$ | $n_3 = 1.74$ | $\nu_3 = 31.7$ |
| $r_6 = 0.8746$ | | | |
| | $d_6 = 0.448$ | $n_4 = 1.497$ | $\nu_4 = 81.6$ |
| $r_7 = -1.3340$ | | | |
| | $d_7 = 4.500$ | | |
| $r_8 = 5.3474$ | | | |
| | $d_8 = 0.169$ | $n_5 = 1.6779$ | $\nu_5 = 53.36$ |
| $r_9 = 1.6259$ | | | |
| | $d_9 = 0.441$ | $n_6 = 1.48749$ | $\nu_6 = 70.15$ |
| $r_{10} = -8.9572$ | | | |
| | $f = 1.00$ | N.A = 0.65 | |
| Petzval's sum = 0.026 | | Magnification $-40.001X$ | |

Embodiment 6

| | | | |
|---|---|---|---|
| $r_1 = -0.325$ | | | |
| | $d_1 = 0.579$ | $n_1 = 1.7725$ | $\nu_1 = 49.6$ |
| $r_2 = -0.590$ | | | |
| | $d_2 = 0.010$ | | |
| $r_3 = 5.699$ | | | |
| | $d_3 = 0.342$ | $n_2 = 1.726$ | $\nu_2 = 53.56$ |
| $r_4 = -1.043$ | | | |
| | $d_4 = 0.010$ | | |
| $r_5 = -7.519$ | | | |
| | $d_5 = 0.049$ | $n_4 = 1.74$ | $\nu_3 = 31.7$ |
| $r_6 = 0.875$ | | | |
| | $d_6 = 0.403$ | $n_4 = 1.497$ | $\nu_3 = 81.6$ |
| $r_7 = -1.335$ | | | |
| | $d_7 = 4.550$ | | |
| $r_8 = 5.335$ | | | |
| | $d_8 = 0.169$ | $n_5 = 1.6779$ | $\nu_5 = 55.33$ |
| $r_9 = 1.625$ | | | |
| | $d_9 = 0.438$ | $n_6 = 1.48749$ | $\nu_6 = 70.15$ |
| $r_{10} = -8.8801$ | | | |
| | $f = 1.00$ | N.A = 0.65 | |
| Petzval's sum = 0.027 | | Magnification $-40.012X$ | |

Embodiment 7

| | | | |
|---|---|---|---|
| $r_1 = -0.326$ | | | |
| | $d_1 = 0.577$ | $n_1 = 1.7725$ | $\nu_1 = 49.6$ |
| $r_2 = -0.589$ | | | |
| | $d_2 = 0.010$ | | |
| $r_3 = 5.557$ | | | |
| | $d_3 = 0.341$ | $n_2 = 1.726$ | $\nu_2 = 53.56$ |
| $r_4 = -1.049$ | | | |
| | $d_4 = 0.010$ | | |
| $r_5 = -7.582$ | | | |
| | $d_5 = 0.100$ | $n_3 = 1.74$ | $\nu_3 = 31.7$ |
| $r_6 = 0.879$ | | | |
| | $d_6 = 0.397$ | $n_4 = 1.497$ | $\nu_4 = 81.6$ |
| $r_7 = -1.328$ | | | |
| | $d_7 = 4.521$ | | |
| $r_8 = 5.373$ | | | |

-continued

Embodiment 7

| | | | |
|---|---|---|---|
| $r_9 = 1.637$ | $d_8 = 0.190$ | $n_5 = 1.6779$ | $\nu_5 = 55.33$ |
| | $d_9 = 0.476$ | $n_6 = 1.48749$ | $\nu_6 = 70.15$ |
| $r_{10} = -8.875$ | | | |
| | $f = 1.00$ | $N.A = 0.65$ | |
| Petzval's sum $= 0.031$ | | Magnification $-39.999X$ | |

Embodiment 8

| | | | |
|---|---|---|---|
| $r_1 = -0.339$ | $d_1 = 0.588$ | $n_1 = 1.804$ | $\nu_1 = 46.57$ |
| $r_2 = -0.611$ | $d_2 = 0.010$ | | |
| $r_3 = 5.506$ | $d_3 = 0.349$ | $n_2 = 1.726$ | $\nu_2 = 53.56$ |
| $r_4 = -1.057$ | $d_4 = 0.010$ | | |
| $r_5 = -7.460$ | $d_5 = 0.120$ | $n_3 = 1.74$ | $\nu_3 = 31.7$ |
| $r_6 = 0.883$ | $d_6 = 0.400$ | $n_4 = 1.497$ | $\nu_4 = 81.6$ |
| $r_7 = -1.336$ | $d_7 = 4.371$ | | |
| $r_8 = 5.365$ | $d_8 = 0.130$ | $n_5 = 1.6779$ | $\nu_5 = 55.33$ |
| $r_9 = 1.641$ | $d_9 = 0.344$ | $n_6 = 1.48749$ | $\nu_6 = 70.15$ |
| $r_{10} = -8.577$ | | | |
| | $f = 1.00$ | $N.A = 0.65$ | |
| Petzval's sum $= 0.042$ | | Magnification $-40.011X$ | |

Embodiment 9

| | | | |
|---|---|---|---|
| $r_1 = -0.368$ | $d_1 = 0.645$ | $n_1 = 1.883$ | $\nu_1 = 40.76$ |
| $r_2 = -0.675$ | $d_2 = 0.010$ | | |
| $r_3 = 5.334$ | $d_3 = 0.338$ | $n_2 = 1.72916$ | $\nu_2 = 54.68$ |
| $r_4 = -1.095$ | $d_4 = 0.010$ | | |
| $r_5 = -7.771$ | $d_5 = 0.120$ | $n_3 = 1.74$ | $\nu_3 = 31.70$ |
| $r_6 = 0.884$ | $d_6 = 0.4$ | $n_4 = 1.48656$ | $\nu_4 = 84.47$ |
| $r_7 = -1.359$ | $d_7 = 4.416$ | | |
| $r_8 = 5.543$ | $d_8 = 0.15$ | $n_5 = 1.67$ | $\nu_5 = 57.33$ |
| $r_9 = 1.649$ | $d_9 = 0.45$ | $n_6 = 1.48749$ | $\nu_6 = 70.15$ |
| $r_{10} = -8.883$ | | | |
| | $f = 1.00$ | $N.A = 0.65$ | |
| Petzval's sum $= 0.025$ | | Magnification $-40.000X$ | | wherein the reference symbols $r_1$ through $r_{10}$ represent radii of curvature on the surfaces of the respective lens elements, the reference symbols $d_1$ through $d_9$ designate thicknesses of the respective lens elements and airspace therebetween, the reference symbols $n_1$ through $n_6$ denote refractive indices of the respective lens elements and the reference symbols $\nu_1$ through $\nu_6$ represent Abbe's numbers of the respective lens elements.

As is understood from the detailed descriptions as well as the embodiments and aberration curves thereof, the objective lens system for microscopes according to the present invention comprises a small number of lenses, i.e., four components of six lens elements, has a Petzval's sum nearly equal to zero, assures chromatic aberration corrected sufficiently for an achromat lens system and has performance sufficiently high for a plan achromat objective lens designed for a magnification level of 40X.

I claim:

1. An objective lens system for microscopes comprising a first negative meniscus lens component having a concave surface on the object side, a second positive lens component, a third positive cemented doublet lens component and a fourth positive cemented doublet lens component, and said lens system satisfying the conditions enumerated below:

$$0.5f \leq d_1 \leq 0.7f \tag{1}$$

$$1.5/f \leq 1.4 \left| \frac{n_1 - 1}{r_2} \right| \leq \left| \frac{n_1 - 1}{r_1} \right| \leq 3.0/f \tag{2}$$

$$1.9 \geq n_1 \geq 1.7 \tag{3}$$

$$55 \geq \nu_1 \geq 35 \tag{4}$$

$$1.8 \geq n_2 \geq 1.7 \tag{5}$$

$$96 \geq \nu_4 \geq 80 \tag{6}$$

$$5.0f \geq d_7 \geq 4.0f \tag{7}$$

$$190 \leq 1.6(\nu_5 + \nu_6) \leq \nu_1 + \nu_2 + \nu_3 + \nu_4 \tag{8}$$

wherein the reference symbols $r_1$ and $r_2$ represent radii of curvature on the respective surfaces of the first lens component, the reference symbol $d_1$ designates thickness of the first lens component, the reference symbol $d_7$ denotes the airspace reserved between the third and fourth lens components, the reference symbols $n_1$ and $n_2$ designate refractive indices of the first and second lens components respectively, the reference symbols $\nu_1$ through $\nu_6$ denote Abbe's numbers of the respective lens elements and the reference symbol f represents focal length of the objective lens system as a whole.

2. An objective lens system for microscope according to claim 1 having the numerical data specified below:

| | | | |
|---|---|---|---|
| $r_1 = -0.317$ | $d_1 = 0.567$ | $n_1 = 1.762$ | $\nu_1 = 40.2$ |
| $r_2 = -0.577$ | $d_2 = 0.011$ | | |
| $r_3 = 7.868$ | $d_3 = 0.292$ | $n_2 = 1.713$ | $\nu_2 = 53.89$ |
| $r_4 = -1.045$ | $d_4 = 0.011$ | | |
| $r_5 = 59.973$ | $d_5 = 0.112$ | $n_3 = 1.7552$ | $\nu_3 = 27.51$ |
| $r_6 = 0.977$ | $d_6 = 0.423$ | $n_4 = 1.43389$ | $\nu_4 = 95.15$ |
| $r_7 = -1.148$ | $d_7 = 4.704$ | | |
| $r_8 = 4.537$ | $d_8 = 0.166$ | $n_5 = 1.641$ | $\nu_5 = 56.93$ |
| $r_9 = 1.473$ | $d_9 = 0.434$ | $n_6 = 1.48749$ | $\nu_6 = 70.15$ |
| $r_{10} = -17.947$ | | | |
| | $f = 1.00$ | $N.A = 0.65$ | |
| Petzval's sum $= 0.039$ | | Magnification $-39.992X$ | | wherein the reference symbols $r_1$ through $r_{10}$ represent radii of curvature on the surfaces of the respective lens elements, the reference symbols $d_1$ through $d_9$ designate thicknesses of the respective lens elements and airspace reserved therebetween, the reference symbols $n_1$ through $n_6$ denote refractive indices of the respective lens elements, the reference symbols $\nu_1$ through $\nu_6$ represent Abbe's numbers of the respective lens elements and the reference symbol f designates focal length of the objective lens system as a whole.

3. An objective lens system for microscope according to claim 1 having the numerical data specified below:

| | | | |
|---|---|---|---|
| $r_1 = -0.305$ | | | |
| | $d_1 = 0.563$ | $n_1 = 1.72$ | $\nu_1 = 43.7$ |
| $r_2 = -0.5549$ | | | |
| | $d_2 = 0.011$ | | |
| $r_3 = 7.6596$ | | | |
| | $d_3 = 0.297$ | $n_2 = 1.713$ | $\nu_2 = 53.89$ |
| $r_4 = -1.063$ | | | |
| | $d_4 = 0.011$ | | |
| $r_5 = 50.978$ | | | |
| | $d_5 = 0.114$ | $n_3 = 1.7552$ | $\nu_3 = 27.51$ |
| $r_6 = 0.998$ | | | |
| | $d_6 = 0.429$ | $n_4 = 1.43389$ | $\nu_4 = 95.15$ |
| $r_7 = -1.17$ | | | |
| | $d_7 = 4.78$ | | |
| $r_8 = 4.7097$ | | | |
| | $d_8 = 0.169$ | $n_5 = 1.641$ | $\nu_5 = 56.93$ |
| $r_9 = 1.475$ | | | |
| | $d_9 = 0.441$ | $n_6 = 1.48749$ | $\nu_6 = 70.15$ |
| $r_{10} = -16.379$ | | | |
| f = 1.00 | | N.A = 0.65 | |
| Petzval's sum = 0.026 | | Magnification −40.794X | | wherein the reference symbols $r_1$ through $r_{10}$ represent radii of curvature on the surfaces of the respective lens elements, the reference symbols $d_1$ through $d_9$ designate thicknesses of the respective lens elements and airspace reserved therebetween, the reference symbols $n_1$ through $n_6$ denote refractive indices of the respective lens elements, the reference symbols $\nu_1$ through $\nu_9$ represent Abbe's numbers of the respective lens elements and the reference symbol f designates focal length of the objective lens system as a whole.

4. An objective lens system for microscope according to claim 1 having the numerical data specified below:

| | | | |
|---|---|---|---|
| $r_1 = -0.307$ | | | |
| | $d_1 = 0.562$ | $n_1 = 1.72$ | $\nu_1 = 50.25$ |
| $r_2 = -0.562$ | | | |
| | $d_2 = 0.012$ | | |
| $r_3 = 3.939$ | | | |
| | $d_3 = 0.298$ | $n_2 = 1.713$ | $\nu_2 = 53.89$ |
| $r_4 = -1.030$ | | | |
| | $d_4 = 0.010$ | | |
| $r_5 = -13.468$ | | | |
| | $d_5 = 0.114$ | $n_3 = 1.74$ | $\nu_3 = 31.70$ |
| $r_6 = 0.808$ | | | |
| | $d_6 = 0.448$ | $n_4 = 1.48605$ | $\nu_4 = 81.81$ |
| $r_7 = -1.330$ | | | |
| | $d_7 = 4.600$ | | |
| $r_8 = 4.3405$ | | | |
| | $d_8 = 0.169$ | $n_5 = 1.6779$ | $\nu_5 = 53.36$ |
| $r_9 = 1.575$ | | | |
| | $d_9 = 0.441$ | $n_6 = 1.48749$ | $\nu_6 = 70.15$ |
| $r_{10} = -14.785$ | | | |
| f = 1.00 | | N.A = 0.65 | |
| Petzval's sum = 0.050 | | •Magnification −39.998X | | wherein the reference symbols $r_1$ through $r_{10}$ represent radii of curvature on the surfaces of the respective lens elements, the reference symbols $d_1$ through $d_9$ designate thicknesses of the respective lens elements and airspace reserved therebetween, the reference symbols $n_1$ through $n_6$ denote refractive indices of the respective lens elements, the reference symbols $\nu_1$ through $\nu_6$ represent Abbe'numbers of the respective lens elements and the reference symbol f designates focal length of the objective lens system as a whole.

5. An objective lens system for microscope according to claim 1 having the numerical data specified below:

| | | | |
|---|---|---|---|
| $r_1 = -0.307$ | | | |
| | $d_1 = 0.563$ | $n_1 = 1.720$ | $\nu_1 = 50.25$ |
| $r_2 = -0.551$ | | | |
| | $d_2 = 0.011$ | | |
| $r_3 = 4.237$ | | | |
| | $d_3 = 0.298$ | $n_2 = 1.726$ | $\nu_2 = 53.56$ |
| $r_4 = -1.040$ | | | |
| | $d_4 = 0.010$ | | |
| $r_5 = -7.4631$ | | | |
| | $d_5 = 0.114$ | $n_3 = 1.74$ | $\nu_3 = 31.7$ |
| $r_6 = 0.836$ | | | |
| | $d_6 = 0.448$ | $n_4 = 1.48605$ | $\nu_4 = 81.81$ |
| $r_7 = -1.269$ | | | |
| | $d_7 = 4.500$ | | |
| $r_8 = 4.858$ | | | |
| | $d_8 = 0.169$ | $n_5 = 1.6779$ | $\nu_5 = 53.36$ |
| $r_9 = 1.615$ | | | |
| | $d_9 = 0.441$ | $n_6 = 1.48749$ | $\nu_6 = 70.15$ |
| $r_{10} = -10.144$ | | | |
| f = 1.00 | | N.A = 0.65 | |
| Petzval's sum = 0.052 | | Magnification −40.001X | | wherein the reference symbols $r_1$ through $r_{10}$ represent radii of curvature on the surfaces of the respective lens elements, the reference symbols $d_1$ through $d_9$ designate thicknesses of the respective lens elements and airspace reserved therebetween, the reference symbols $n_1$ through $n_6$ denote refractive indices of the respective lens elements, the reference symbols $\nu_1$ through $\nu_6$ represent Abbe's numbers of the respective lens elements and the reference symbol f designates focal length of the objective lens system as a whole.

6. An objective lens system for microscope according to claim 1 having the numerical data specified below:

| | | | |
|---|---|---|---|
| $r_1 = -0.3253$ | | | |
| | $d_1 = 0.583$ | $n_1 = 1.7725$ | $\nu_1 = 49.6$ |
| $r_2 = -0.5906$ | | | |
| | $d_2 = 0.011$ | | |
| $r_3 = 5.7075$ | | | |
| | $d_3 = 0.298$ | $n_2 = 1.726$ | $\nu_2 = 53.56$ |
| $r_4 = -1.0426$ | | | |
| | $d_4 = 0.013$ | | |
| $r_5 = -7.5229$ | | | |
| | $d_5 = 0.115$ | $n_3 = 1.74$ | $\nu_3 = 31.7$ |
| $r_6 = 0.8746$ | | | |
| | $d_6 = 0.448$ | $n_4 = 1.497$ | $\nu_4 = 81.6$ |
| $r_7 = -1.3340$ | | | |
| | $d_7 = 4.500$ | | |
| $r_8 = 5.3474$ | | | |
| | $d_8 = 0.169$ | $n_5 = 1.6779$ | $\nu_5 = 53.36$ |
| $r_9 = 1.6259$ | | | |
| | $d_9 = 0.441$ | $n_6 = 1.48749$ | $\nu_6 = 70.15$ |
| $r_{10} = -8.9572$ | | | |
| f = 1.00 | | N.A = 0.65 | |
| Petzval's sum = 0.026 | | Magnification −40.001X | | wherein the reference symbols $r_1$ through $r_{10}$ radii of curvature on the surfaces of the respective lens elements, the reference symbols $d_1$ through $d_9$ designate thicknesses of the respective lens elements and airspace reserved therebetween, the reference symbols $n_1$ through $n_6$ denote refractive indices of the respective lens elements, the reference symbols $\nu_1$ through $\nu_6$ represent Abbe's numbers of the respective lens elements and the reference symbol f designates focal length of the objective lens system as a whole.

7. An objective lens system for microscope according to claim 1 having the numericla data specified below:

| | | | |
|---|---|---|---|
| $r_1 = -0.325$ | | | |
| | $d_1 = 0.579$ | $n_1 = 1.7725$ | $\nu_1 = 49.6$ |
| $r_2 = -0.590$ | | | |
| | $d_2 = 0.010$ | | |
| $r_3 = 5.699$ | | | |
| | $d_3 = 0.342$ | $n_2 = 1.726$ | $\nu_2 = 53.56$ |
| $r_4 = -1.043$ | | | |
| | $d_4 = 0.010$ | | |
| $r_5 = -7.519$ | | | |
| | $d_5 = 0.049$ | $n_3 = 1.74$ | $\nu_3 = 31.7$ |
| $r_6 = 0.875$ | | | |
| | $d_6 = 0.403$ | $n_4 = 1.497$ | $\nu_4 = 81.6$ |
| $r_7 = -1.335$ | | | |
| | $d_7 = 4.550$ | | |
| $r_8 = 5.335$ | | | |
| | $d_8 = 0.169$ | $n_5 = 1.6779$ | $\nu_5 = 55.33$ |
| $r_9 = 1.625$ | | | |
| | $d_9 = 0.438$ | $n_6 = 1.48749$ | $\nu_6 = 70.15$ |
| $r_{10} = -8.8801$ | | | |
| $f = 1.00$ | | $N.A = 0.65$ | |
| Petzval's sum $= 0.027$ | | Magnification $-40.012X$ | | wherein the reference symbols $r_1$ through $r_{10}$ represent radii of curvature on the surfaces of the respective lens elements, the reference symbols $d_1$ through $d_9$ designate thicknesses of the respective lens elements and airspace reserved therebetween, the reference symbols $n_1$ through $n_6$ denote refractive indices of the respective lens elements, the reference symbols $\nu_1$ through $\nu_6$ represent Abbe's numbers of the respective lens elements and the reference symbol f designates focal length of the objective lens system as a whole.

8. An objective lens system for microscope according to claim 1 having the numerical data specified below:

| | | | |
|---|---|---|---|
| $r_1 = -0.326$ | | | |
| | $d_1 = 0.577$ | $n_1 = 1.7725$ | $\nu_1 = 49.6$ |
| $r_2 = -0.589$ | | | |
| | $d_2 = 0.010$ | | |
| $r_3 = 5.557$ | | | |
| | $d_3 = 0.341$ | $n_2 = 1.726$ | $\nu_2 = 53.56$ |
| $r_4 = -1.049$ | | | |
| | $d_4 = 0.010$ | | |
| $r_5 = -7.582$ | | | |
| | $d_5 = 0.100$ | $n_3 = 1.74$ | $\nu_3 = 31.7$ |
| $r_6 = 0.879$ | | | |
| | $d_6 = 0.397$ | $n_4 = 1.497$ | $\nu_4 = 81.6$ |
| $r_7 = -1.328$ | | | |
| | $d_7 = 4.521$ | | |
| $r_8 = 5.373$ | | | |
| | $d_8 = 0.190$ | $n_5 = 1.6779$ | $\nu_5 = 55.33$ |
| $r_9 = 1.637$ | | | |
| | $d_9 = 0.476$ | $n_6 = 1.48749$ | $\nu_6 = 70.15$ |
| $r_{10} = -8.875$ | | | |
| $f = 1.00$ | | $N.A = 0.65$ | |
| Petzval's sum $= 0.031$ | | Magnification $-39.999X$ | | wherein the reference symbols $r_1$ through $r_{10}$ represent radii of curvature on the surfaces of the respective lens elements, the reference symbols $d_1$ through $d_9$ designate thicknesses of the respective lens elements and airspace reserved therebetween, the reference symbols $n_1$ through $n_6$ denote refractive indices of the respective lens elements, the reference symbols $\nu_1$ through $\nu_6$ represent Abbe's numbers of the respective lens elements and the reference symbol f designates focal length of the objective lens system as a whole.

9. An objective lens system for microscope according to claim 1 having the numerical data specified below:

| | | | |
|---|---|---|---|
| $r_1 = -0.339$ | | | |
| | $d_1 = 0.588$ | $n_1 = 1.804$ | $\nu_1 = 46.57$ |
| $r_2 = -0.611$ | | | |
| | $d_2 = 0.010$ | | |
| $r_3 = 5.506$ | | | |
| | $d_3 = 0.349$ | $n_2 = 1.726$ | $\nu_2 = 53.56$ |
| $r_4 = -1.057$ | | | |
| | $d_4 = 0.010$ | | |
| $r_5 = -7.460$ | | | |
| | $d_5 = 0.120$ | $n_3 = 1.74$ | $\nu_3 = 31.7$ |
| $r_6 = 0.883$ | | | |
| | $d_6 = 0.400$ | $n_4 = 1.497$ | $\nu_4 = 81.6$ |
| $r_7 = -1.336$ | | | |
| | $d_7 = 4.371$ | | |
| $r_8 = 5.365$ | | | |
| | $d_8 = 0.130$ | $n_5 = 1.6779$ | $\nu_5 = 55.33$ |
| $r_9 = 1.641$ | | | |
| | $d_9 = 0.344$ | $n_6 = 1.48749$ | $\nu_6 = 70.15$ |
| $r_{10} = -8.577$ | | | |
| $f = 1.00$ | | $N.A = 0.65$ | |
| Petzval's sum $= 0.042$ | | Magnification $-40.011X$ | | wherein the reference symbols $r_1$ through $r_{10}$ represent radii of curvature on the surfaces of the respective lens elements, the reference symbols $d_1$ through $d_9$ designate thicknesses of the respective lens elements and airspace reserved therebetween, the reference symbols $n_1$ through $n_6$ denote refractive indices of the respective lens elements, the reference symbols $\nu_1$ through $\nu_6$ represent Abbe's numbers of the respective lens elements and the reference symbol f designates focal length of the objective lens system as a whole.

10. An objective lens system for microscope according to claim 1 having the numerical data specified below:

| | | | |
|---|---|---|---|
| $r_1 = -0.368$ | | | |
| | $d_1 = 0.645$ | $n_1 = 1.883$ | $\nu_1 = 40.76$ |
| $r_2 = -0.675$ | | | |
| | $d_2 = 0.010$ | | |
| $r_3 = 5.334$ | | | |
| | $d_3 = 0.338$ | $n_2 = 1.72916$ | $\nu_2 = 54.68$ |
| $r_4 = -1.095$ | | | |
| | $d_4 = 0.010$ | | |
| $r_5 = -7.771$ | | | |
| | $d_5 = 0.120$ | $n_3 = 1.74$ | $\nu_3 = 31.70$ |
| $r_6 = 0.884$ | | | |
| | $d_6 = 0.4$ | $n_4 = 1.48656$ | $\nu_4 = 84.47$ |
| $r_7 = -1.359$ | | | |
| | $d_7 = 4.416$ | | |
| $r_8 = 5.543$ | | | |
| | $d_8 = 0.15$ | $n_5 = 1.67$ | $\nu_5 = 57.33$ |
| $r_9 = 1.649$ | | | |
| | $d_9 = 0.45$ | $n_6 = 1.48749$ | $\nu_6 = 70.15$ |
| $r_{10} = -8.883$ | | | |
| $f = 1.00$ | | $N.A = 0.65$ | |
| Petzval's sum $= 0.025$ | | Magnification $-40.000X$ | | wherein the reference symbols $r_1$ through $r_{10}$ represent radii of curvature on the surfaces of the respective lens elements, the reference symbols $d_1$ through $d_9$ designate thicknesses of the respective lens elements and airspace reserved therebetween, the reference symbol $n_1$ through $n_6$ denote refractive indices of the respective lens elements, the reference symbols $\nu_1$ through $\nu_6$ represent Abbe's numbers of the respective lens elements and the reference symbol f designates focal length of the objective lens system as a whole.

* * * * *